Feb. 7, 1950 M. GLASER 2,497,027
METHOD FOR TESTING RADIO RECEIVERS TO DETERMINE
THE NUMBER OF TURNS OF THE LOOP ANTENNA
Filed Aug. 26, 1944
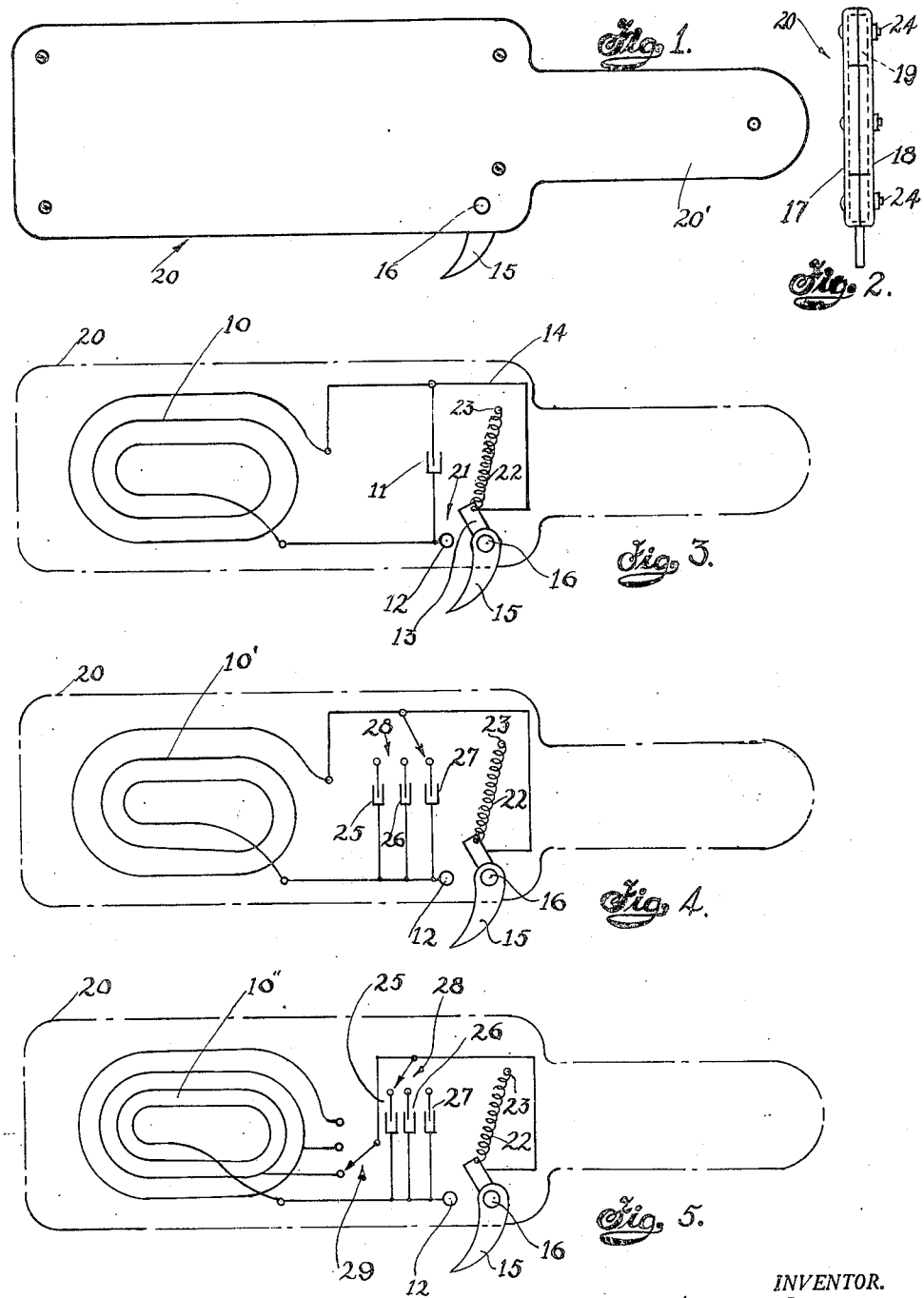
INVENTOR.
MARCUS GLASER
BY
ATTORNEY Patented Feb. 7, 1950

2,497,027

UNITED STATES PATENT OFFICE 2,497,027

METHOD FOR TESTING RADIO RECEIVERS TO DETERMINE THE NUMBER OF TURNS OF THE LOOP ANTENNA

Marcus Glaser, New York, N. Y.

Application August 26, 1944, Serial No. 551,354

1 Claim. (Cl. 250—20)

This invention relates to a method and means for use in calibrating radio receiver apparatus employing loop antennas.

The principal object of this invention is to provide a novel and improved method and means to indicate whether in a radio receiver using a loop antenna, the latter is properly aligned for the tuning range it is designed for, and if not at what is commonly called "peak" condition to effect maximum signal intensity; to indicate whether the loop antenna has too many or too few turns.

Another object of this invention is to provide a novel and improved method of the character mentioned, which is simple to practice and instantaneous in its findings.

A further object of the present invention is to provide a simple device for the practice of the method concerned with herein, which is easy and convenient to use and effective in carrying out the purposes for which it is designed; and if desired, may have included adjustment means to adapt the device for use with receivers of different tuning ranges.

Another object hereof is to provide a novel and improved device of the character described, which is cheap to manufacture, small and compact, easily manipulated, includes nothing to get out of order and is positive in its performance.

Other objects and advantages will become apparent as this disclosure proceeds.

I have discovered that if an external tuned circuit comprising a loop with a small capacitor across same, where the conductance of the loop and the capacitance are of such relation that the circuit will resonate at or a little above the highest frequency of the tuning range of a radio receiver using a loop antenna, that upon placing the loop of the external circuit substantially parallel to and adjacent the loop antenna of the receiver while the latter is in operation, that if said loop antenna is properly aligned for the tuning range the receiver is designed for, the signal intensity of the reception becomes diminished, and upon short-circuiting the external loop, said signal intensity will also become diminished. However, should said signal intensity become greater when the loop of the external circuit is not short-circuited, then it is an indication that the loop antenna of the receiver is of insufficient inductance, and should it so happen that said signal intensity becomes greater when the loop of the external circuit is short-circuited, then it is an indication that the inductance of the loop antenna of the receiver is greater than is properly required. The effect of the open external or test circuit is as if turns are added to the loop antenna, and of the short-circuited test circuit, as if turns are removed from said loop antenna. Adjustment can thereupon be made in the receiver apparatus until signal intensity is diminished both when the external tuned circuit is open and when shorted.

The apparatus comprising the external tuned circuit can be arranged in any convenient manner, and preferably can be made as an assembled structure to serve as a testing instrument. For receivers having different tuning ranges or spectra, a single testing instrument may be provided where either or both the external circuit's inductance or the capacitance included therein may be varied in required relation by selective switching arrangements.

I will now describe instruments having these features, with which my present method can be practiced.

In the accompanying drawings forming part of this application, similar characters of reference indicate corresponding parts in all the views.

Fig. 1 is a front view of an embodiment of the testing instrument. What is seen is the exterior of a casing, housing apparatus therein, and an operative element in the form of a trigger.

Fig. 2 is an end view of Fig. 1.

Fig. 3 is a diagrammatic view of one embodiment of the testing apparatus and the electrical wiring connections of the components thereof. For clarity of illustration, the outline of the casing is shown by a dash and dot line.

Fig. 4 is a view similar to that of Fig. 3, showing a modified embodiment.

Fig. 5 is a similar view of another embodiment of the testing means.

In the drawings, the numeral 10 indicates an inductance which is a flat coil or loop, shunted by a condenser or capacitor 11, and a switch adapted to short-circuit said loop and condenser. Said switch comprises a fixed metal element 12 electrically connected to one terminal of each of the said loop and condenser, and a movable metal element 13 electrically connected to the other terminals of said loop and condenser by conductor 14. The movable element 13 is mounted on a trigger 15 which is pivotally mounted by a pin 16 positioned through the walls of the casing halves 17 and 18. Chamber 19 of the housing or flat casing 20, houses the loop 10, condenser 11, switch 21 and their electrical connectors, as well as a coil spring for maintaining switch 21 in open condition. Said coil spring indicated by the numeral 22, is secured at one end at 23, and its other end is secured to element 13. The trigger 15, of course, extends exterior the casing 20, and is movable between its halves 17 and 18.

The casing halves 17 and 18 are of electrically insulative material, as Bakelite, fibre and the like, and the assembly of the instrument is effected by means of the bolts and nuts 24, or by any other suitable means, as rivets or cement, for instance. The trigger 15 is also made of insulative material. If desired, the casing may be shaped to include a suitable handle component as 20'. For convenience, it may be in flat pistol or wand form.

The testing instrument of Fig. 3, is of course suitable with respect to a definite tuning range. To adapt the instrument for use with receivers having different tuning ranges, the modified embodiments illustrated in Figs. 4 and 5 may be employed. The embodiment of Fig. 4, includes a plurality of condensers 25, 26 and 27, any one of which may be chosen to be included in the test circuit, by means of the selective switch indicated generally by the numeral 28. Of course, the respective condensers are in definite relationships with respect to the inductance or loop 10' in the embodiment of Fig. 4. In Fig. 5, where the inductance and the capacitance are both variable, the several condensers are here designated by the numerals 25, 26 and 27 as previously and their selective switch as 28, while the switch to alter the inductance of the tapped test loop 10'', is designated by 29. It is obvious that the test instrument may have either its capacitance or the inductance component variable as here set forth.

As a matter of practical example, I find that a testing instrument having a circuit tuned to resonate at about 1650 to 1675 kilocycles, would serve for the practice of my present method on receivers having a tuning range of from about 540 to 1650 kilocycles. Further, I may suggest that the external tune circuit may be designed as determined by the formula:

$$F \text{ equals } \frac{1}{2\pi\sqrt{LC}}$$

where

F denotes frequency in kilocycles at which the external tuned circuit is to resonate. This should be at, or a little above the highest frequency the radio receiver is tuned to.

L is inductance of the external test loop 10, in microhenrys, and

C stands for capacity of the condenser 11 of the testing circuit measured in micromicrofarads.

This invention is capable of numerous forms, various applications and for other purposes without departing from the essential features herein disclosed. It is therefore intended and desired that the patent shall cover all patentable novelty herein set forth, and that the specific use and embodiments herein shall be deemed illustrative and not restrictive; reference being had to the following claims rather than to the particular description herein to indicate the scope of this invention.

I claim:

The method of testing whether a loop antenna included in a radio receiver of predetermined tuning range, has the proper, excessive or insufficient number of turns to effect maximum signal intensity producible by the receiver; said method utilizing an external tuned circuit comprising a condenser, an electrical conductor formed into a loop having its ends out of contact and a switch, all electrically connected in parallel relation; the capacity of said condenser and the inductance of said external loop being of such relation that the external circuit will resonate at, or a little above the highest frequency of the tuning range of the radio receiver, comprising of placing the external loop adjacent and parallel to the loop antenna while the radio receiver is in operation, opening said switch whereby said external loop in parallel with said condenser is inductively coupled to said receiver antenna, and closing said switch whereby said external tuned circuit is short circuited and electromagnetically removed from said receiver, as a result of which the output signal of said receiver decreases in response to both opening and closing said switch when the number of turns in said receiver loop antenna is proper, the output signal increases in response to closing of said switch when the number of turns in said receiver loop antenna is excessive and the output signal increases in response to opening of said switch when the number of turns in said receiver loop antenna is insufficient.

MARCUS GLASER.

REFERENCES CITED

The following references are of record in the file of this patent:

UNITED STATES PATENTS

| Number | Name | Date |
|---|---|---|
| 1,447,165 | Kolster | Feb. 27, 1923 |
| 1,647,474 | Seymour | Nov. 1, 1927 |
| 1,852,769 | Collard | Apr. 5, 1932 |
| 1,903,665 | Adey | Apr. 11, 1933 |
| 2,109,189 | Bly | Feb. 22, 1938 |
| 2,249,166 | Parker et al. | July 15, 1941 |